(12) United States Patent
Schoohf

(10) Patent No.: US 9,625,294 B2
(45) Date of Patent: Apr. 18, 2017

(54) FLOW MEASURING DEVICE

(71) Applicant: Endress + Hauser Flowtec AG, Reinach (CH)

(72) Inventor: Michael Schoohf, Biel-Benken (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 14/906,136

(22) PCT Filed: Jul. 7, 2014

(86) PCT No.: PCT/EP2014/064453
§ 371 (c)(1),
(2) Date: Jan. 19, 2016

(87) PCT Pub. No.: WO2015/010882
PCT Pub. Date: Jan. 29, 2015

(65) Prior Publication Data
US 2016/0161308 A1    Jun. 9, 2016

(30) Foreign Application Priority Data

Jul. 24, 2013  (DE) .......................... 10 2013 107 895

(51) Int. Cl.
*G01F 1/58* (2006.01)
*F16L 58/00* (2006.01)
(Continued)

(52) U.S. Cl.
CPC .............. *G01F 1/584* (2013.01); *F16L 58/00* (2013.01); *G01F 1/58* (2013.01); *F16L 57/06* (2013.01); *F16L 58/1036* (2013.01)

(58) Field of Classification Search
CPC .......................................................... G01F 1/58
(Continued)

(56) References Cited

U.S. PATENT DOCUMENTS

| 2,766,621 A | 10/1956 | Raynsford et al. |
| 3,190,116 A | 6/1965 | Romanowski |

(Continued)

FOREIGN PATENT DOCUMENTS

| DE | 10304568 A1 | 9/2003 |
| DE | 102006060443 A1 | 6/2008 |

(Continued)

OTHER PUBLICATIONS

English Translation of International Preliminary Report on Patentability, WIPO, Geneva, Feb. 4, 2016.
(Continued)

*Primary Examiner* — Jewel V Thompson
(74) *Attorney, Agent, or Firm* — Bacon & Thomas, PLLC

(57) ABSTRACT

In a flow measuring device having a measuring tube with a sensor arrangement and an evaluation unit for ascertaining a flow, a sensor arranged on or in a measuring tube having a tube wall of a metal support material and a first ply of a corrosion resistant material that protects the metal support material from corrosive measured media and is placed on an inner surface of the tube wall; or a tube wall of a corrosion resistant material, wherein in the measuring tube on the side of the first ply facing the medium or on the side of the measuring tube wall of the corrosion resistant, synthetic material facing the medium a ply or second ply is arranged for reducing mechanical loading, of the synthetic material by the measured medium, wherein the ply or second ply has a greater hardness than the first ply or the tube wall.

15 Claims, 2 Drawing Sheets

(51) Int. Cl.
*F16L 57/06* (2006.01)
*F16L 58/10* (2006.01)

(58) Field of Classification Search
USPC .................................................... 73/861.12
See application file for complete search history.

(56) References Cited

U.S. PATENT DOCUMENTS

| | | | |
|---|---|---|---|
| 3,750,468 A | | 8/1973 | Grauer |
| 4,517,846 A | | 5/1985 | Harrison et al. |
| 4,522,073 A | | 6/1985 | Knaak |
| 4,741,215 A | * | 5/1988 | Bohn ................... G01F 1/588 |
| | | | 73/861.12 |
| 5,062,305 A | | 11/1991 | Hansen et al. |
| 5,337,607 A | * | 8/1994 | Brown ................... G01F 1/58 |
| | | | 29/595 |
| 5,852,362 A | | 12/1998 | Batenburg et al. |
| 6,877,386 B2 | | 4/2005 | Needham et al. |
| 7,261,001 B2 | * | 8/2007 | Heijnsdijk ............. G01F 1/58 |
| | | | 73/861.12 |
| 7,992,453 B1 | | 8/2011 | Lawrence |
| 8,434,371 B2 | * | 5/2013 | Marsh ................... G01F 1/002 |
| | | | 73/861.12 |
| 8,528,417 B2 | | 9/2013 | Neuburger et al. |
| 8,561,480 B2 | | 10/2013 | Lawrence |
| 9,121,740 B2 | * | 9/2015 | Neven ................... G01F 1/588 |
| 2007/0039398 A1 | | 2/2007 | Conrady et al. |
| 2007/0251578 A1 | | 11/2007 | McGuire |
| 2008/0174110 A1 | | 7/2008 | Olson |
| 2008/0257064 A1 | | 10/2008 | Nielsen |

FOREIGN PATENT DOCUMENTS

| | | |
|---|---|---|
| DE | 102007005670 A1 | 8/2008 |
| DE | 102008038162 A1 | 3/2010 |
| EP | 0724138 A1 | 7/1996 |
| GB | 1156875 A | 7/1969 |
| WO | 2012097195 A1 | 7/2012 |

OTHER PUBLICATIONS

International Search Report,, EPO, The Netherlands, Sep. 18, 2014.
German Search Report, German PTO, Munich, Mar. 18, 2014.

* cited by examiner

FLOW MEASURING DEVICE

TECHNICAL FIELD

The present invention relates to a flow measuring device as defined in the preamble of claim 1.

BACKGROUND DISCUSSION

Known are flow measuring devices with measuring tubes, which have an outer tube of metal support material, which is equipped with a first ply of a corrosion resistant and diffusion blocking, synthetic material, the so-called liner. This material protects the outer tube from aggressive media.

Problematic in the case of usual liner materials installed in flow measuring devices is that they have poor volume stability and are not abrasion resistant. As a result of deformation and abrasion, thus in the case of mechanical loading of the liner material by the measured medium, measurement errors occur in the ascertaining of the flow.

It is, thus, an object of the present invention to provide a more exact flow measurement.

SUMMARY OF THE INVENTION

The present invention achieves this object by a flow measuring device as defined in claim 1.

A flow measuring device of the invention includes a measuring tube with a sensor arrangement and an evaluation unit for ascertaining a flow velocity, a volume flow and/or a mass flow, wherein the sensor arrangement is arranged on or in the measuring tube, which measuring tube has:
A1) a measuring tube wall of a metal support material and
B1) a first ply of a corrosion resistant, synthetic material, wherein the first ply protects the metal support material from corrosive measured media and is placed on an inner surface of the measuring tube wall; or
A2) a measuring tube wall of a corrosion resistant, synthetic material; wherein
C) in the measuring tube on the side of the first ply facing the medium or on the side of the measuring tube wall of the corrosion resistant, synthetic material facing the medium a ply or second ply is arranged for reducing mechanical loading, especially abrasive loading, of the synthetic material by the measured medium, wherein the ply or second ply has a greater hardness than the first ply or the measuring tube wall of corrosion resistant, synthetic material.

The second ply protects the measuring tube from mechanical loadings by the measured medium. These can be e.g. pressure loadings or abrasive loadings.

Advantageous embodiments of the invention are subject matter of the dependent claims.

It is advantageous when the second ply is composed of more than 90 wt-% of a material selected from the following materials: ceramic, ceramic composite material, cermet, ormocer coatings, glass, polymer materials, especially aluminum oxide and/or zirconium oxide and/or a composite material containing hard material.

These materials have supplementally to especially high hardness also comparatively good chemical durability.

Hard materials are comparatively difficult to manufacture as a molded piece. Therefore, a bonding matrix is preferably used for hard material particles. The hard material containing, composite material can advantageously be embodied as a ceramic composite material, wherein the hard material is preferably an oxidic or nitridic hard material.

Ideally, the first ply is highly diffusion blocking. It is, consequently, advantageous that the first ply be composed of a synthetic material based on a polyfluorinated polymer and/or a natural or synthetic rubber, preferably PFA and/or PTFE and/or vinyl rubber.

The hardness of the second ply should ideally be significantly greater than the hardness of the first ply. The Vickers hardness of the second ply is especially preferably at least two times, quite especially preferably at least five times, greater than the Vickers hardness of the first ply.

In order to enable a replaceability, on the one hand, and low pipeline forces on the second ply, on the other hand, the second ply is advantageously embodied as an internal tube, especially as a ceramic tube, which is arranged loosely in the measuring tube.

Thus, to counter the mentioned pipeline forces, the second ply is arranged loosely in the measuring tube and is advantageously secured against slipping along a measuring tube axis in the measuring tube by means of retaining washers, which are arranged terminally on the measuring tube.

The retaining washers are advantageously composed of a corrosion resistant, nickel material.

The second ply can advantageously have terminal grooves, against which the retaining washers can be pressed, wherein the grooves are embodied in such a manner that the retaining washer edge side toward the measured medium is covered by the second ply. In this way, the retaining washers are laterally protected from mechanical loadings and, in given cases, also from abrasion.

The second ply in the measuring tube is advantageously replaceable, so that, in the case of damage to the ply, the entire device does not have to be replaced, but, instead, only the ply.

It is advantageous, when the second ply is embodied terminally conically in such a manner that its inner diameter in a middle region of the measuring tube is less than its inner diameter in an end region of the measuring tube.

To the extent that the first ply has no adhesive bonding to the metal support material, the second ply can advantageously support the first ply in the case of negative pressure in the measuring tube, so that the first ply does not release into the interior of the tube.

Especially advantageous is application of the invention in a magneto inductive flow measuring device. Such a flow measuring device comprises a magnet system for establishing a magnetic field, which passes through the measured medium located in the measuring tube, and at least two measuring electrodes for sensing a voltage induced by movement of the measured medium, wherein the first ply and the second ply are each composed of electrically insulating material and wherein openings for measuring electrodes are provided in the respective material plies.

It is advantageous, when at least the electrode heads are composed of a material, which has at least the same hardness or a greater hardness than the second ply. In this way, the electrode heads can resist most abrasive media.

In case, nevertheless, abrasion of the electrode heads is experienced, then the measuring electrodes can advantageously have electrode heads, which are replaceable.

BRIEF DESCRIPTION OF THE DRAWINGS

The subject matter of the invention will now be described in greater detail based on a number of examples of embodiments presented in the appended drawing, the figures of which show as follows.

DETAILED DESCRIPTION

In automation technology, especially in process automation technology, flow measuring devices are often applied, which serve for registering and/or influencing process variables. A large number of such flow measuring devices are produced and sold by the firm, Endress+Hauser. Flow measuring devices include, in such case, especially Coriolis, ultrasonic, vortex, thermal and/or magneto inductive, flow measuring devices.

Usually applied in many of the aforementioned flow measuring devices are measuring tubes, which at least in the medium-contacting regions of the respective measuring tubes are lined with a so-called liner. This prevents, for example, the corrosion of a metal support tube, and acts, among other things, also as electrical insulation, as well as reducing the tendency for growth of germs in the measuring tube The aforementioned flow measuring devices have, in each case, at least one measuring tube as well as one or more sensors for ascertaining a flow related, measured variable and an evaluation unit for ascertaining the flow velocity, the volume—and/or the mass flow of a measured medium flowing through the measuring tube.

Shown in FIGS. 1-4 by way of example for the aforementioned flow measuring devices are different measuring tube variants of magneto inductive measuring devices.

The principle of a magneto inductive flow measurement will now be explained in greater detail. Construction and measuring principle of a magneto inductive flow measuring device are well known to those skilled in the art. According to Faraday's law of induction, a voltage is induced in a conductor, for example, a conductive, fluid, measured medium, which moves in a magnetic field. A magnetic field B of constant strength is produced by a magnet system, for example, two field coils on two sides of the measuring tube. Located perpendicularly thereto on the tube inner wall of the measuring tube are two or more measuring electrodes, which sense the voltage produced in the case of the measured substance flowing through the measuring tube. The induced voltage is proportional to the flow velocity v and therewith to the volume flow of the measured medium.

The present invention relates to the construction of a measuring tube of a flow measuring device, respectively of a magneto inductive flow measuring device. FIGS. 1-4 focus, therefore, on the measuring tube. The magnet system and the evaluation unit are, consequently, for reasons of perspicuity, not shown.

Figure 1:
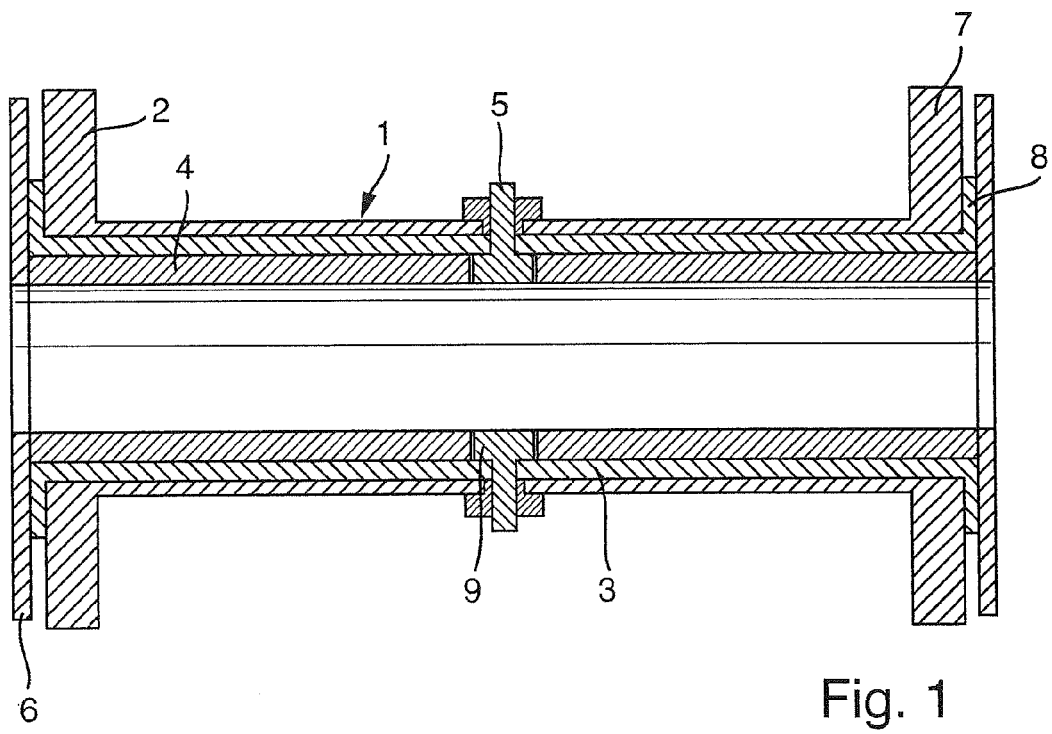
FIG. 1 is a sectional view of a measuring tube of a first flow measuring device of the invention, which is embodied as a magneto inductive flow measuring device.

FIG. 1 shows a measuring tube 1 with an outer tube 2 of a metal support material. The outer tube includes on each end a flange 7 for connecting the measuring tube 1 to a process pipeline. Arranged within the measuring tube is a first ply for protecting the metal support material from corrosive measured media. This first ply is composed preferably of a synthetic material. The first ply is not only corrosion resistant but also blocks access to the metal support material in such a manner that no measured medium can reach the metal support material. It is, thus, also a barrier to diffusion. Preferred materials for the first ply are polyfluorinated polymers such as e.g. PFA or PTFE or rubber derivatives of natural or synthetic rubber. These materials have, among other things, the advantages of a high sealing action and a high chemical resistance to corrosive media. They are electrically insulating, which is a great advantage, especially for magneto inductive flow measuring devices.

The bonding of the first ply occurs in the case of rubber by vulcanizing and in the case of polyfluorinated synthetic materials almost exclusively mechanically. For this, the first ply 3 is terminally flanged. The flanging 8 of the first ply 3 is correspondingly shown in FIG. 1. Due to the poor adhesion of the first ply to the metal support body, especially in the case of polyfluorinated synthetic materials, the connection of the first ply to the support body is achieved by the terminal flanges 8. Problematic, however, is that the liner in the case of vacuum, respectively negative pressure, faces the measuring tube interior and can release from the support material.

The materials of the first ply 3, for example PFA, PTFE or rubber, especially vinyl rubber, have low Vickers hardnesses. As a result, sand or pebbles entrained in the measured media can abrasively attack and destroy the first ply 3. On the other hand, polyfluorinated polymers have excellent chemical durability under contact by most known chemical substances and form at the same time, similarly to rubber, good diffusion barriers. In this way, the metal support material is optimally protected from the medium.

In order to prevent abrasion of the first ply, the flow measuring device of the invention includes a second ply 4 in the measuring tube 1. Ply 4 is composed of a harder material, or material mixture, than the first ply 3. In this way, abrasive media such as used e.g. in the oil and gas industry, such as e.g. fracking compositions of water and sand (for example, in the case of shale gas production), water/waste water with or without particles, acid containing, fluid media, particle loaded fluid media, especially sand loaded fluid media, in given cases, also conductive media containing diesel oil, can be measured.

Highly accurate measuring under special measuring conditions can occur, conditions such as e.g. periodic vacuum in the measuring tube, extreme chemical aggressiveness of the measured medium, grinding abrasion or, however, especially in the case of flow measuring devices, which are not embodied as a magneto inductive flow measuring device, with oil containing media as measured medium.

Hardness here is the Vickers hardness of the respective materials of the plies. This can be ascertained according to the standard, DIN EN ISO 6507-1:2005 to -4:2005. In contrast to Rockwell testing, an equal sided diamond pyramid with an included angle of 136° is pressed with a fixed test force into the workpiece. From the length of the diagonals of the resulting depression, as established by means of a measuring microscope, the area of the depression is calculated.

The material of the second ply is preferably a ceramic, ceramic composite material, cermet, ormocer coating, glass, polymer material, especially aluminum oxide and/or zirconium oxide and/or a composite material containing hard material.

Cermets are composite materials composed of ceramic materials in a metal matrix. Ormocers (organic modified ceramics) are inorganic, organic, hybrid polymers, which were developed by the Fraunhofer Institute. Hard materials are especially hard materials with a high amount of metal bond character. They are primarily nitrides, oxides and carbides.

Especially in the case of magneto inductive flow measuring devices, the materials installed for the first and second plies should be electrically insulating and thus have a resistivity of greater than $10^7$ Ωm, preferably greater than $10^9$ Ωm (at 20° C.). In the case of magneto inductive flow measuring devices, for example, due to their most often small conductivity, oxides and nitrides are preferred over the metal carbides as hard materials or hard material additives.

Arranged in the measuring tube are measuring electrodes 5, which sense the induced voltage. These measuring electrodes 5 are composed of an electrically conductive material.

In a first embodiment of the measuring electrodes, such are formed of a softer material than the aforementioned second ply. The measuring electrodes 5 have electrode heads 9. The electrode heads are preferably replaceable. Thus, the electrode heads are abraded off by the measured medium until the second ply begins to protect the electrode material from the abrasive forces of the measured medium. Thus, the electrodes are protected from further abrasion by sitting recessed in an electrode bore arranged in the second ply.

In a second embodiment of the invention, the measuring electrodes have an equal or greater hardness than the second ply. In this case, the measuring electrodes are subject to only little abrasive attack from the measured medium.

The measuring electrodes are usually composed of a chemically resistant material, preferably a nickel-based material, and are conductive. They have, thus, a resistivity of less than $10^{-4}$ Ωm (at 20° C.). Applied as harder electrode material can be conductive alloys or composite materials e.g. of metal containing, conductive, hard materials, preferably metal carbides. Tungsten electrodes or electrodes of conductive ceramic can likewise be preferably applied, due to their high hardness.

The second ply 4 is preferably embodied as an interior tube, which is arranged between two retaining washers 6. The retaining washers 6 can preferably be manufactured of a nickel-based material. They limit the movement of the interior tube in the axial direction of measuring tube 1. The interior tube lies loosely in the measuring tube 1 and is preferably manufactured of a ceramic or a ceramic composite material. Temperature related tensile stresses in the axial direction and/or pipeline forces do not reach the interior tube in the case of this construction. In this embodiment with an interior tube, a small amount of medium can, for example, get between the second ply and the first ply, but this has little relevance for the measurements.

FIG. 1 shows only one way of holding the second ply, wherein the retaining washer 6 is clamped or otherwise secured between a flange 7 of the measuring tube 1 and an additional (not shown) flange e.g. of a process connection.

In a variation of FIG. 1, the first ply can undertake the sealing function between the measured medium and the retaining washer.

For an especially effective protection from mechanical loadings, the Vickers hardness of the second ply is at least two times, preferably five times, greater than the Vickers hardness of the first ply. The hardness of the second ply amounts to more than 800 HV, especially preferably more than 1000 HV, at 20° C.

Besides the increased abrasive resistance capability of the measuring tube, also the volume stability of the second ply is improved. Usually, many liner materials, such as e.g. PTFE exhibit a poor volume stability under higher medium pressures. The liner is, thus, pressed away. This is, however, prevented by the second ply, which bears part of the pressure. In the case of negative pressure, respectively vacuum, additionally the liner, respectively the first ply, can collapse due to poor chemical bonding to the measuring tube wall. In the case of this application, the second ply exercises a support function.

The length expansion coefficient of the material of the second ply is preferably less than 13 ppm per degree Kelvin.

Figure 2:
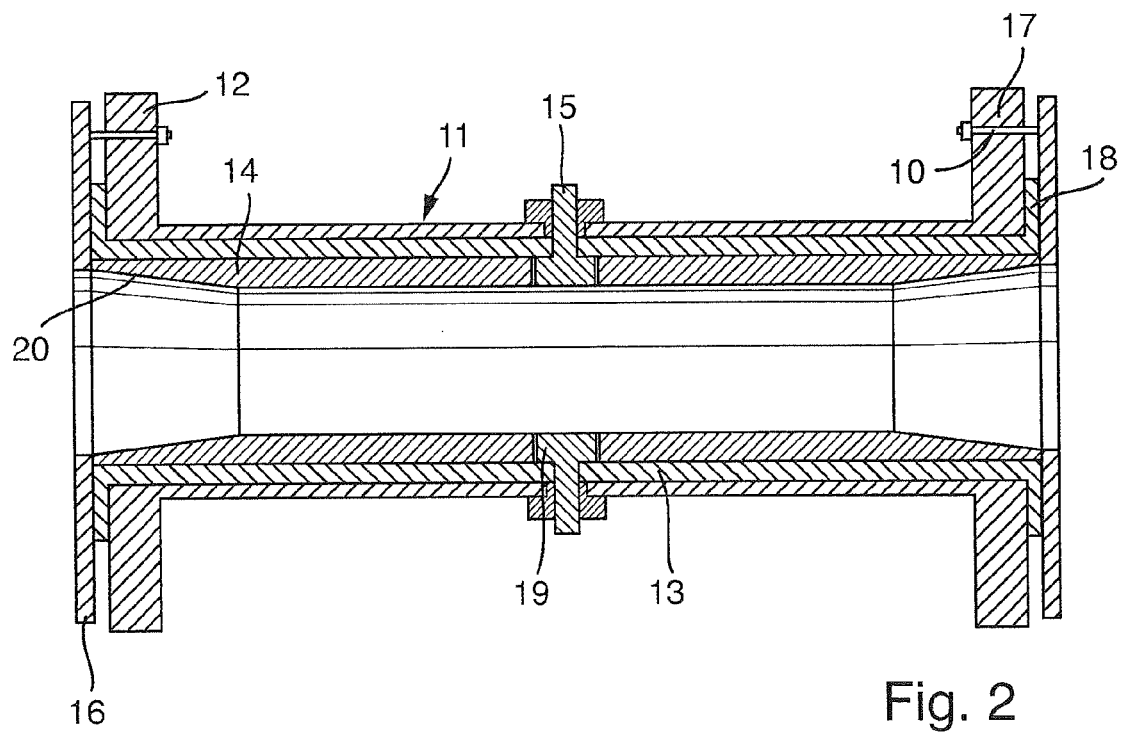
FIG. 2 is a sectional view of a measuring tube of a second flow measuring device of the invention, which is embodied as a magneto inductive flow measuring device.
Figure 3:
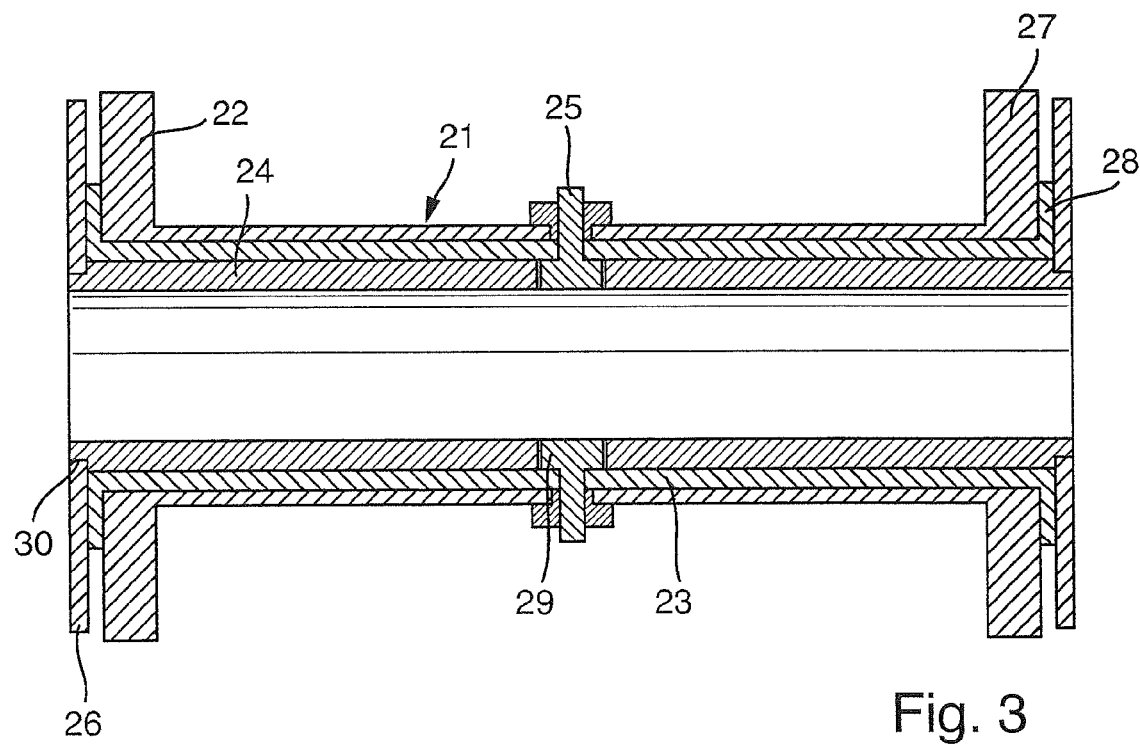
FIG. 3 is a sectional view of a measuring tube of a third flow measuring device of the invention, which is embodied as a magneto inductive flow measuring device.

FIGS. 2 and 3 show measuring tubes of other flow measuring devices of the invention. These present other preferred structural variations of the measuring tube of FIG. 1. Chemical/physical properties of the measuring tube and the individual material plies are assumed unchanged in these additional embodiments.

FIG. 2 shows a measuring tube 11 of a second embodiment with a material layering analogous to FIG. 1. Measuring tube 11 includes an outer tube of a metal support material 12, as well as a first ply 13 arranged on the inner wall the outer tube. Additionally arranged in the measuring tube 11 is a second ply 14, which protects the first ply from mechanical loading e.g. by the measured medium. Further shown in FIG. 2 are measuring electrodes 15 with corresponding measuring electrode heads 19. The electrodes are led through the individual material plies. The first ply 13 includes a flange 18 for its mechanical connection to the outer tube. The second ply 14 is terminally constrained by retaining washers 16, which are fixed by means of securement means 10, in this case, screws, to the flange 17 of the measuring tube 11. This has the advantage that the second ply 13 is not first secured during the affixing at the location of use, but is, instead, already premounted in the measuring tube 11. Furthermore, the accuracy of measurement is increased, when the second ply has a conical inlet 20 and a conical outlet, so that the inner circumference of the measuring tube 11 in the terminal regions of the measuring tube 11 is greater than in the middle region.

It is especially advantageous, when the second ply in the measuring tube is replaceable, so that after a certain duration of operation in the case of measuring abrasive media not the entire measuring device but, instead, only the second ply need be replaced. For this, it is sufficient e.g. unilaterally to release one of the retaining washers 6, 16, 26 or 36.

FIG. 3 shows a third embodiment of a measuring tube 21 of a flow measuring device. Measuring tube 21 includes an outer tube of a metal support material 22, as well as a first ply 23 arranged on the inner wall of the outer tube and within the measuring tube a thereon following, second ply 24, which protects the first ply from mechanical loading e.g. by the measured medium. As in the case of the preceding examples of embodiments, the second ply does not necessarily have to be connected to the first ply but can, instead, also be present loosely, in given cases, with a small separation, respectively play, relative to the first ply. As in FIG. 2, measuring electrodes 25 with corresponding electrode heads 29 are present. The measuring electrodes are led through the individual material plies. The first ply 23 includes a flange 28 for its mechanical connection to the outer tube. The second ply 24 is constrained terminally by retaining washers 26. These can be secured, for example, clamped, together with the flanges 28 between the flanges 27 and additional (not shown) flanges of a pipeline.

The second ply extends, in such case, up to the external end faces of the retaining washers 26 and includes for accommodating the same grooves 30. Each groove 30 is present in FIG. 3 as a right angled groove, into which the retaining washer is inserted, so that the terminal end face of each retaining washer 26 extends on the same plane as a terminal end face of the second ply 24. In this way, the second ply ends directly at a process connection or process line.

Of course, the embodiments illustrated in FIGS. 1-3 and design improvements thereof can be combined with one another in the context of the present invention.

Figure 4:
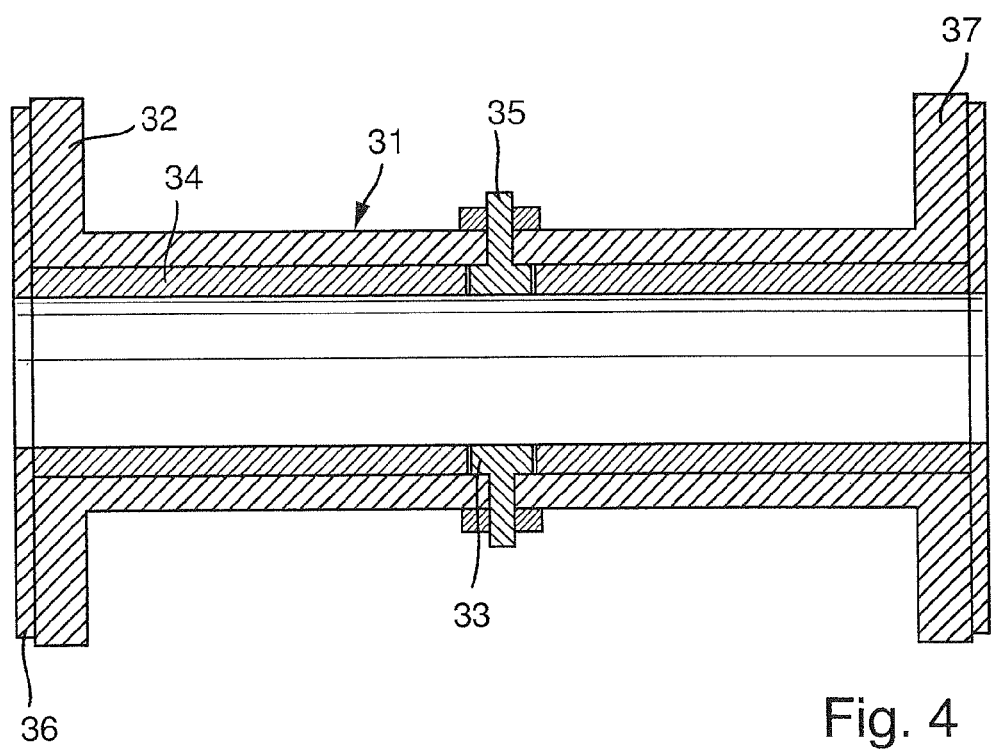
FIG. 4 is a sectional view of a measuring tube of a fourth flow measuring device of the invention, which is embodied as a magneto inductive flow measuring device.

FIG. 4 shows a third embodiment of a measuring tube 31 of a flow measuring device of the invention. Here, instead of a metal support material and a corrosion protecting ply, a plastic measuring tube is applied. This plastic measuring tube, respectively the measuring tube wall, can itself comprise an anticorrosive and, in given cases, electrically insulating, plastic material 32.

This measuring tube can preferably have terminal flanges 37 or enable a so-called flangeless connection with a process connection or pipeline connection. Integrated or separately provided electrofusion couplings can be applied on the measuring tube 31 for this.

Inserted within the measuring tube of plastic material is a ply 34, which protects the measuring tube wall—like the above second ply shown in FIGS. 1-3—from mechanical loading, especially abrasion, by the measured medium. The material properties and embodiment of ply 34 is as already described above for the second ply in the case of the embodiments of FIGS. 1-3.

Inserted in the measuring tube 31 and the ply 34 are measuring electrodes 35 with corresponding measuring electrode heads. The material and the mechanical embodiment of these measuring electrodes are analogous to the measuring electrodes described for FIGS. 1-3.

The plastic material of the measuring tube of FIG. 4 can be any conventional plastic material used for measuring tubes, a preferred material being polyethylene (PE). Also in this example of an embodiment, the axial movement of the ply 34 is limited by terminal retaining washers 36. The structurally advantageous variations of the measuring tubes of FIGS. 2 and 3 can, however, also be applied for the plastic measuring tube.

The invention claimed is:

1. Flow measuring device comprising a measuring tube with a sensor arrangement and an evaluation unit for ascertaining a flow velocity, a volume flow and/or a mass flow, wherein the sensor arrangement is arranged on or in a measuring tube, which measuring tube has: a measuring tube wall of a metal support material and a first ply of a corrosion resistant, synthetic material, wherein the first ply protects the metal support material from corrosive measured media and is placed on an inner surface of the measuring tube wall; or a measuring tube wall of a corrosion resistant, synthetic material; wherein
  in the measuring tube on the side of the first ply facing the medium or on the measuring tube wall of the corrosion resistant, synthetic material facing the medium a ply or second ply is arranged for reducing mechanical loading, especially abrasive loading, of the synthetic material by the measured medium, wherein the ply or second ply has a greater hardness than the first ply or the measuring tube wall of corrosion resistant, synthetic material.

2. Flow measuring device as claimed in claim 1, wherein the ply or second ply is composed of more than 90 wt-% of a material selected from the following materials: ceramic, ceramic composite material, cermet, ormocer coatings, glass, polymer materials, especially aluminum oxide and/or zirconium oxide and/or composite material containing hard material.

3. Flow measuring device as claimed in claim 2, wherein the hard material containing, composite material is a ceramic composite material and wherein the hard material is preferably an oxidic or nitridic hard material.

4. Flow measuring device as claimed in claim 1, wherein the first ply is composed of a synthetic material based on a polyfluorinated polymer and/or a natural or synthetic rubber, preferably PFA and/or PTFE and/or vinyl rubber.

5. Flow measuring device as claimed in claim 1, wherein Vickers hardness of the second ply is at least two times, preferably five times, greater than the Vickers hardness of the first ply.

6. Flow measuring device as claimed in claim 1, wherein the second ply is embodied as a ceramic tube, which is arranged loosely in the measuring tube.

7. Flow measuring device as claimed in claim 1, wherein the second ply is arranged loosely in the measuring tube and secured against slipping along a measuring tube axis in the measuring tube by means of retaining washers, which are arranged terminally on the measuring tube.

8. Flow measuring device as claimed in claim 7, wherein the retaining washers are composed of a corrosion resistant, nickel material.

9. Flow measuring device as claimed in claim 7, wherein the second ply has terminal grooves, into which the retaining washers can be pressed, wherein the grooves are embodied in such a manner that the retaining washers edge side toward the measured medium are covered by the second ply.

10. Flow measuring device as claimed in claim 1, wherein the second ply is replaceable in the measuring tube.

11. Flow measuring device as claimed in claim 1, wherein the second ply is embodied terminally conically in such a manner that its inner diameter in a middle region of the measuring tube is less than its inner diameter in an end region of the measuring tube.

12. Flow measuring device as claimed in claim 1, wherein the first ply has no adhesive bonding to the metal support material and the second ply supports the first ply in the case of negative pressure in the measuring tube.

13. Flow measuring device as claimed in claim 1, wherein the flow measuring device is a magneto inductive measuring device comprising a magnet system for establishing a magnetic field, which passes through measured medium located in the measuring tube, and at least two measuring electrodes for sensing a voltage induced by movement of the measured medium, wherein the first ply and the second ply are each composed of electrically insulating material and wherein openings for measuring electrodes are provided in the respective material plies.

14. Flow measuring device as claimed in claim 13, wherein the measuring electrodes have electrode heads, wherein at least the electrode heads are composed of a material, which has at least the same hardness or a greater hardness than the second ply.

15. Flow measuring device as claimed in claim 13, wherein the measuring electrodes have electrode heads, which are replaceable.

* * * * *